(12) United States Patent
Mochizuki et al.

(10) Patent No.: US 12,043,168 B1
(45) Date of Patent: Jul. 23, 2024

(54) GASKET AFFIXING STRUCTURE

(71) Applicant: YAZAKI CORPORATION, Tokyo (JP)

(72) Inventors: Yasufumi Mochizuki, Makinohara (JP); Hiroyuki Ooishi, Shimada (JP); Keiji Matsushita, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/439,606

(22) Filed: Feb. 12, 2024

(30) Foreign Application Priority Data

Mar. 20, 2023 (JP) .................. 2023-043826

(51) Int. Cl.
*B60Q 1/26* (2006.01)
*F21V 31/00* (2006.01)

(52) U.S. Cl.
CPC .......... *B60Q 1/2653* (2013.01); *F21V 31/005* (2013.01)

(58) Field of Classification Search
CPC .......... B60Q 1/2653; B60Q 3/00; B60Q 1/00; F21V 31/005
USPC ....................................................... 362/267
See application file for complete search history.

(56) References Cited

U.S. PATENT DOCUMENTS

2010/0328960 A1* 12/2010 Wang ................ F21V 29/51
362/373

FOREIGN PATENT DOCUMENTS

JP  H04-51829 U    4/1992
KR  200452297 Y1 * 2/2011

* cited by examiner

*Primary Examiner* — Laura K Tso
(74) *Attorney, Agent, or Firm* — KENEALY VAIDYA LLP

(57) ABSTRACT

A gasket affixing structure includes a first component in which a light source is disposed in an internal space part sectioned by a wall part, a second component assembled to the first component so as to cover an opening part of the first component, and a gasket affixed to a gasket affixing area interposed between the first component and the second component. The gasket affixing area includes a light blocking area surrounding the opening part, an abnormal sound prevention area positioned on a plane different from the light blocking area, and an inclined area connecting the light blocking area and the abnormal sound prevention area to each other to make them continuous with each other. The gasket is affixed integrally across the light blocking area, the inclined area, and the abnormal sound prevention area.

6 Claims, 4 Drawing Sheets

GASKET AFFIXING STRUCTURE

CROSS-REFERENCE TO RELATED APPLICATION(S)

The present application claims priority to and incorporates by reference the entire contents of Japanese Patent Application No. 2023-043826 filed in Japan on Mar. 20, 2023.

BACKGROUND OF THE INVENTION

1. Field of the Invention

The present invention relates to a gasket affixing structure.

2. Description of the Related Art

For example, Japanese Unexamined Utility Model Application Publication No. H04-051829 discloses a vehicle instrument including a lamp housing, a plurality of partition walls installed in the lamp housing, warning lamps installed in the inside sectioned by the partition walls, and a warning lens positioned in contact with the partition walls.

The vehicle instrument described in Japanese Unexamined Utility Model Application Publication No. H04-051829 can prevent light leakage as in a case in which a structure in which a gasket is affixed is employed by foaming expandable ink printed on the warning lens, but it is desired to enable soundproofing measures to be taken in addition to light leakage measures, and in this respect, there is room for further improvement.

SUMMARY OF THE INVENTION

The present invention has been made in view of the above circumstances, and an object thereof is to provide a gasket affixing structure that can take soundproofing measures while properly taking light leakage measures.

To achieve the object of the present invention, a gasket affixing structure according to one aspect of the present invention includes a first component in which a light source is disposed in an internal space part sectioned by a wall part and having an opening part opening along an emitting direction of light from the light source; a second component stacked on and assembled to the first component so as to cover the opening part of the first component; and a gasket affixed to a gasket affixing area interposed between the first component and the second component, the gasket affixing area including a light blocking area surrounding the opening part, an abnormal sound prevention area positioned on a plane different from the light blocking area and having a step with respect to the light blocking area, and an inclined area connecting the light blocking area and the abnormal sound prevention area to each other to make the light blocking area and the abnormal sound prevention area continuous with each other, and the gasket being affixed integrally across the light blocking area, the inclined area, and the abnormal sound prevention area.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment according to the present invention in detail based on the accompanying drawings. This embodiment does not limit this invention. The components in the following embodiment include ones that those skilled in the art can replace and are easy and ones that are substantially the same.

Figure 3:
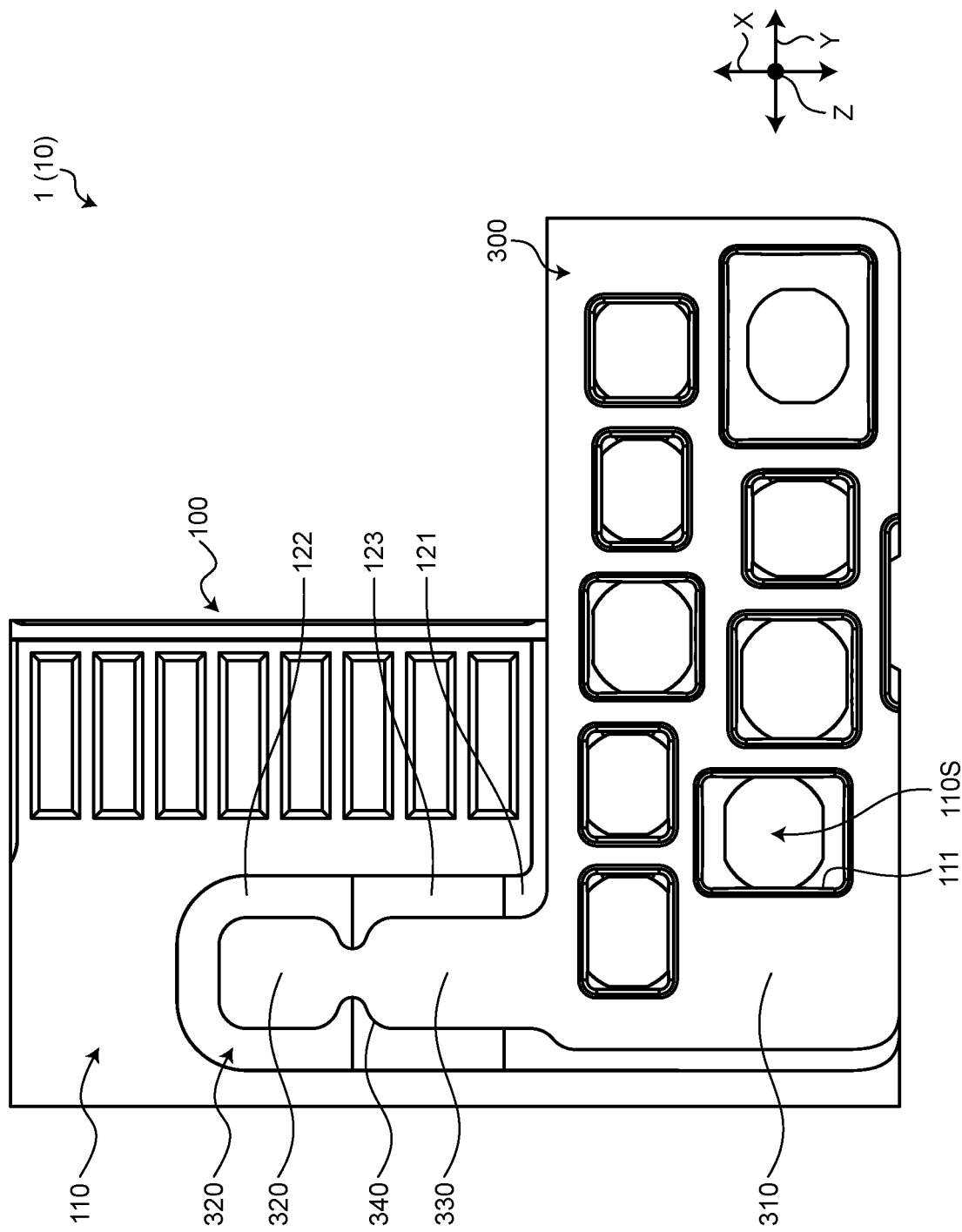
FIG. 3 is a plan view of a gasket affixing area according to the present embodiment.
Figure 4:
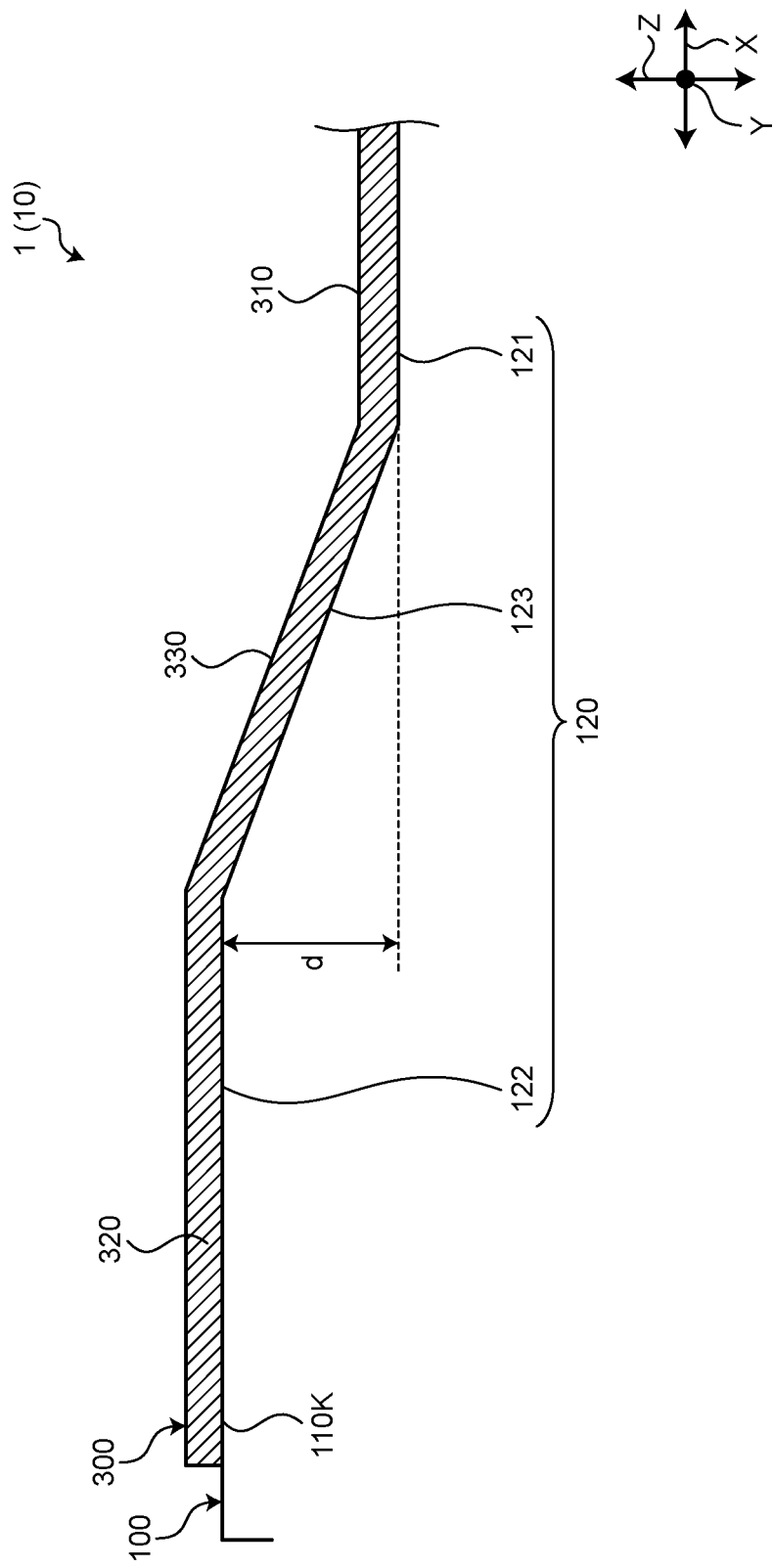
FIG. 4 is a schematic sectional view of the gasket affixing area according to the present embodiment.

Note that FIG. 3 and FIG. 4 illustrate only a first component 100 and a gasket 300 assembled to the first component 100 for the sake of convenience of description.

EMBODIMENT

This gasket affixing structure 1 according to the present embodiment is used for a vehicle-mounted instrument 10. The vehicle-mounted instrument 10 is what is called a meter mounted on a vehicle such as a car and is mounted on an instrument panel provided in a dashboard to display various information to be used for driving the vehicle.

Figure 1:
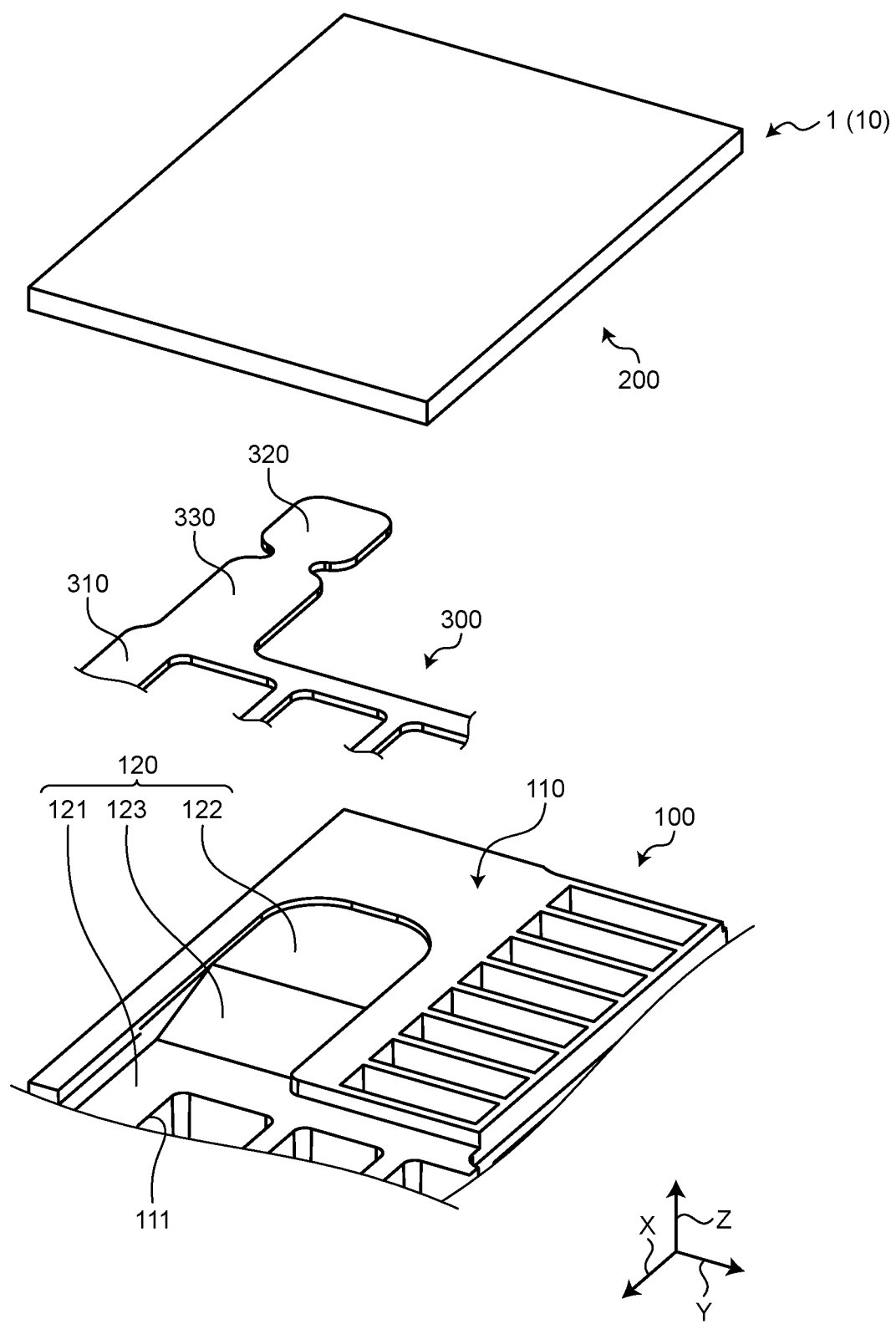
FIG. 1 is an exploded perspective view of a gasket affixing structure according to the present embodiment.
Figure 2:
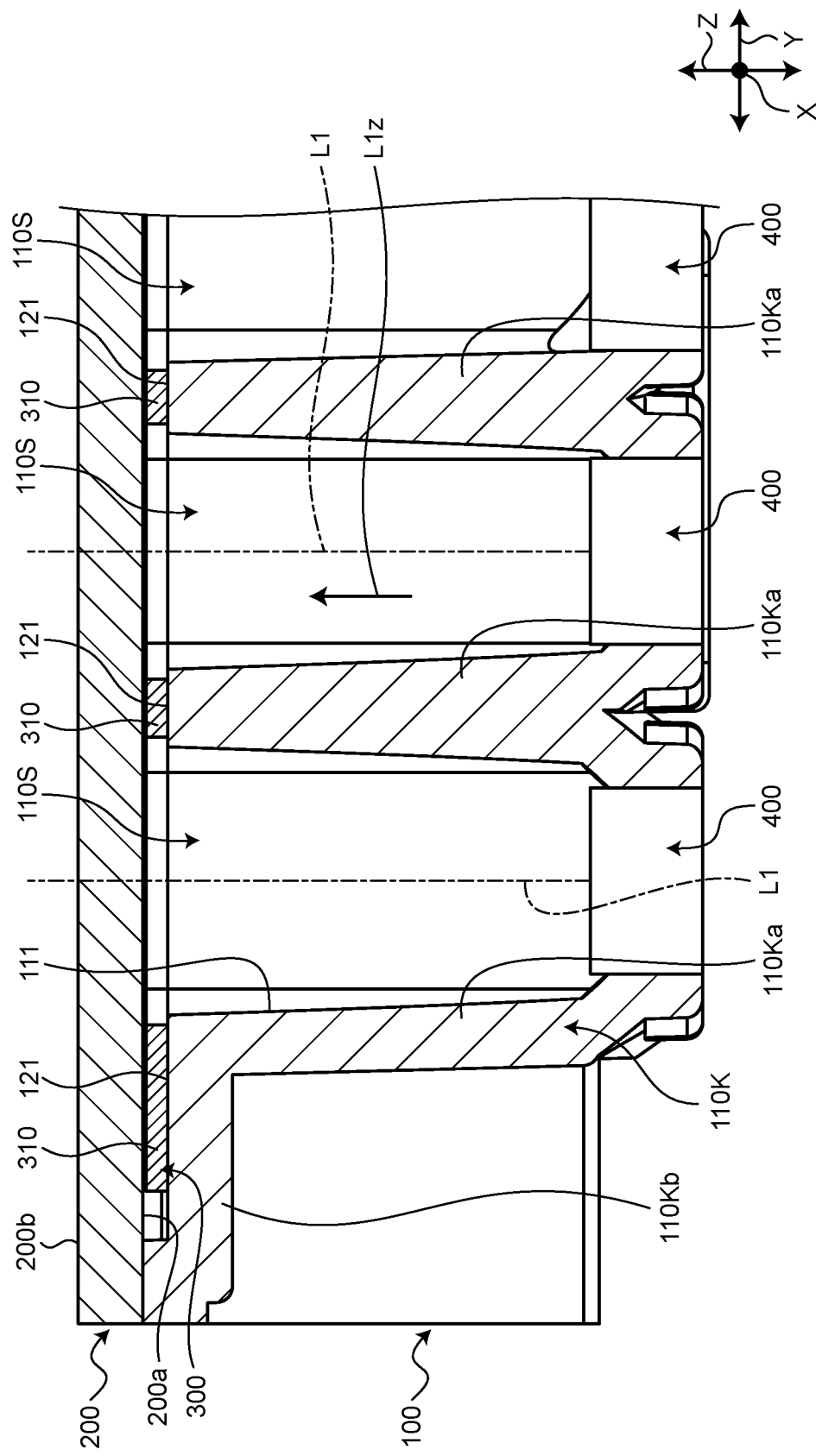
FIG. 2 is a sectional view of the gasket affixing structure according to the present embodiment.

As illustrated in FIG. 1 and FIG. 2, the vehicle-mounted instrument 10 includes the first component 100, a second component 200, the gasket 300, and a plurality of light sources 400. When the gasket affixing structure 1 of the present embodiment is used for the vehicle-mounted instrument 10, a case corresponds to the first component 100, and a cover glass corresponds to the second component 200. The gasket 300 is disposed at a certain area formed in the case (a gasket affixing area 120 described below) and is used as a member interposed between the two components by the cover glass being assembled to the case. The light sources 400 correspond to warning lamps forming telltales that can display warning in accordance with the status of the vehicle by being assembled to the case and emitting light toward the cover glass. In such a configuration, the gasket affixing structure 1 of the present embodiment achieves a configuration that can take soundproofing measures while properly taking light leakage measures by affixing the gasket 300 integrally across a light blocking area 121, an abnormal sound prevention area 122, and an inclined area 123 forming the gasket affixing area 120. The following describes the components of the gasket affixing structure 1 in detail with reference to FIG. 1 to FIG. 4.

In the following description, among a first direction, a second direction, and a third direction that are orthogonal to each other, the first direction is referred to as a "first width direction X", the second direction is referred to as a "second width direction Y", and the third direction is referred to as a "stacking direction Z". In this example, the first width direction X, the second width direction Y, and the stacking direction Z are orthogonal to each other. The first width direction X typically corresponds to an inclination direction of the inclined area 123 of the gasket affixing area 120 or the like. The stacking direction Z typically corresponds to a direction in which the second component 200 is stacked on the first component 100, an emitting direction of light from a light source 400, or the like. Each direction used in the following description is described as a direction with the components of the vehicle-mounted instrument 10 assembled unless otherwise specified.

In the following description, the light emitted from the light source 400 disposed inside the first components 100 is referred to as emitted light L1, and the direction in which the emitted light L1 is emitted is referred to as an emitting direction L1z.

The first component 100 is a box-like component formed of a resin material or the like. As illustrated in FIG. 1 and FIG. 2, the first component 100 includes a main body 110 and the gasket affixing area 120 formed in the main body 110.

As illustrated in FIG. 2, the main body 110 is a portion that is composed of wall parts 110K including a plurality of side wall parts 110Ka and an upper wall part 110Kb, the wall parts 110K being integrally formed, and therefore the main body 110 can house and assemble the light source 400 and the like thereinside (an internal space parts 110S). The side wall parts 110Ka referred to in this example are wall parts extending along the stacking direction Z, each side wall part 110Ka having the plate thickness direction in the first width direction X or the second width direction Y. The upper wall part 110Kb is what is called a ceiling wall and is a wall part extending along the first width direction X and the second width direction Y, the upper wall part 110Kb having the plate thickness direction in the stacking direction Z. The main body 110 of the present embodiment has the internal space part 110S formed by a pair of side wall parts 110Ka each having the plate thickness direction in the first width direction X and a pair of side wall parts 110Ka each having the plate thickness direction in the second width direction Y. A plurality of the internal space parts 110S are provided in a row in each of the first width direction X and the second width direction Y. Thus, the main body 110 houses the light sources 400 in the respective internal space parts 110S, thereby disposing the light sources 400 in a row in each of the first width direction X and the second width direction Y.

As illustrated in FIG. 2, the main body 110 has an opening part 111 provided in the wall part 110K and opening along the stacking direction Z to allow the internal space part 110S and outer space to communicate with each other. The opening part 111 of the present embodiment is formed in a substantially rectangular shape by four side wall parts 110Ka forming the internal space part 110S (refer to FIG. 3). When the light source 400 is disposed at a position facing the opening part 111, the main body 110 can emit the emitted light L1 emitted from the light source 400 along the stacking direction Z along the opening direction of the opening part 111. Thus, the main body 110 can emit the emitted light L1 outward from the opening part 111.

The gasket affixing area 120 is a portion that is formed on an upper end face of the side wall part 110Ka or the upper wall part 110Kb and, by the second component 200 being assembled with the gasket 300 affixed, can dispose the gasket 300 between the gasket affixing area 120 and the second component 200 and hold it therebetween. As illustrated in FIG. 1 and FIG. 2, the gasket affixing area 120 of the present embodiment is formed by a recess with the stacking direction Z as its depth direction. Thus, the gasket affixing area 120 can dispose the affixed gasket 300 in a gap formed between the gasket affixing area 120 and the second component 200 (refer to FIG. 2).

The second component 200 is a plate-like component formed of a translucent material. As illustrated in FIG. 1 and FIG. 2, the second component 200 extends along the first width direction X and the second width direction Y, the second component 200 having the plate thickness direction in the stacking direction Z. When being assembled to the first component 100, the second component 200 is disposed so as to cross the emitting direction L1z of the emitted light L1 emitted from the light source 400. Thus, the second component 200 of the present embodiment enables the emitted light L1 made incident from an inner face 200a positioned closer to the opening part 111 to pass toward an outer face 200b.

The gasket 300 is a sheet-like member formed of a synthetic resin such as a synthetic rubber. As illustrated in FIG. 2, the gasket 300 is disposed in intimate contact with the first component 100 and the second component 200 by its own elasticity. The gasket 300 is provided across the entire gasket affixing area 120 described below. Thus, the gasket 300 of the present embodiment can fill a gap formed between the first component 100 and the second component 200. The details of the gasket 300 will be described below.

The light sources 400 are members including LEDs or the like and emit light by being supplied with electricity from a power supply such as a secondary battery (not illustrated) mounted on the vehicle. As illustrated in FIG. 2, the light sources 400 are disposed in the respective internal space parts 110S. Thus, the light sources 400 of the present embodiment are disposed with the side wall parts 110Ka forming the internal space parts 110S between them, and each of them emits light to emit the emitted light L1 toward the second component 200 assembled to the first component 100 (refer to FIG. 2). The light sources 400 are mounted on a substrate (not illustrated) positioned on the side opposite to the second component 200 and are disposed in the internal space parts 110S by assembling the substrate to the first component 100. The light sources 400 are controlled to be driven via the substrate and, when driven, display patterns (not illustrated) in an illuminated manner to allow warning represented by the patterns to be visually recognized.

In the vehicle-mounted instrument 10 configured as described above, the gasket affixing area 120 of the present embodiment includes the light blocking area 121 surrounding the opening part 111, the abnormal sound prevention area 122 positioned on a plane different from the light blocking area 121, and the inclined area 123 connecting the light blocking area 121 and the abnormal sound prevention area 122 to each other.

The gasket 300 affixed to the gasket affixing area 120 configured as described above includes a light blocking part 310 positioned on the light blocking area 121, an abnormal sound prevention part 320 positioned on the abnormal sound prevention area 122, and a connecting part 330 positioned on the inclined area 123.

The light blocking area 121 is an area that can prevent the emitted light L1 emitted from the light source 400 from leaking through the gap formed between the first component 100 and the second component 200 because the light blocking part 310 of the gasket 300 is affixed to the light blocking area 121. The light blocking area 121 of the present embodiment is formed in a hollow rectangular frame shape disposed surrounding the opening part 111. The light blocking area 121 is disposed so as to surround each of opening parts 111 of the internal space parts 110S, and the areas provided for the respective opening parts 111 are connected to each other to be formed as a large substantially rectangular shape with one outer edge part, and each inner edge part is formed in accordance with the shape of each opening part 111. The light blocking part 310 of the gasket 300 affixed to the light blocking area 121 is formed in accordance with the shape of the light blocking area 121 and by hollowing out the shape corresponding to the opening part 111, and is disposed surrounding the opening part 111. Thus, the light blocking area 121 can prevent part of the emitted light L1 from leaking toward the light source 400 positioned adjacent thereto because the light blocking part 310 of the gasket 300 is affixed to the light blocking area 121. Some light sources 400 of the light sources 400 are disposed adjacent to a gauge (not illustrated) that can display information on the operating status of the vehicle. Thus, the light blocking area 121 can prevent part of the emitted light L1 from leaking toward the gauge because the light blocking part 310 of the gasket 300 is affixed to the light blocking area 121.

The abnormal sound prevention area 122 is an area that can prevent an abnormal sound from occurring when the vehicle or the vehicle-mounted instrument 10 mounted on the vehicle vibrates. As illustrated in FIG. 3 and FIG. 4, the abnormal sound prevention area 122 of the present embodiment is positioned spaced apart from the light blocking area 121 in the first width direction X and is positioned with a step d on the upper side in the stacking direction Z with respect to the light blocking area 121, that is, toward the second component 200. As illustrated in FIG. 3, the abnormal sound prevention area 122 is formed in a substantially rectangular shape extending along the first width direction X and the second width direction Y, and the lengths thereof in the first width direction X and the second width direction Y are both set to be shorter than those of the light blocking area 121. The abnormal sound prevention part 320 of the gasket 300 affixed to the abnormal sound prevention area 122 is formed in a substantially rectangular shape in accordance with the shape of the abnormal sound prevention part 320 and is assembled compressed between the first component 100 and the second component 200. Thus, the abnormal sound prevention area 122 can prevent the first component 100 from coming into contact with the second component 200 and can prevent an abnormal sound from occurring along with vibrations because the abnormal sound prevention part 320 of the gasket 300 is affixed to the abnormal sound prevention area 122.

The inclined area 123 is an area that can make the light blocking area 121 and the abnormal sound prevention area 122 continuous with each other. As illustrated in FIG. 4, the inclined area 123 of the present embodiment includes an inclined face with the step d. The inclined area 123 can connect the light blocking area 121 and the abnormal sound prevention area 122, which are positioned spaced apart from each other in the first width direction X, to each other because the inclined face is formed along the first width direction X. As illustrated in FIG. 3, the inclined area 123 is formed in a substantially rectangular shape extending along the first width direction X and the second width direction Y, and the length thereof in the second width direction Y is set to be equal to that of the abnormal sound prevention area 122. The connecting part 330 of the gasket 300 affixed to the inclined area 123 is formed in a substantially rectangular shape in accordance with the shape of the inclined area 123, and the length thereof in the second width direction Y is set to be equal to that of the abnormal sound prevention part 320.

Thus, the gasket affixing area 120 of the present embodiment is made into a single band shape because the abnormal sound prevention area 122 and the inclined area 123 are positioned in a continuous manner. The inclined area 123 and the abnormal sound prevention area 122, which are formed in a band shape out of a portion of the light blocking area 121 formed in a substantially rectangular shape, are extended because the inclined area 123 and the light blocking area 121 are positioned in a continuous manner. The gasket 300 of the present embodiment is made into a single band shape because the abnormal sound prevention part 320 positioned on the abnormal sound prevention area 122 and the connecting part 330 positioned on the inclined area 123 are positioned in a continuous manner. The connecting part 330 and the abnormal sound prevention part 320, which are formed in a band shape out of a portion of the light blocking part 310 formed in a substantially rectangular shape, are extended because the connecting part 330 positioned on the inclined area 123 and the light blocking part 310 positioned on the light blocking area 121 are positioned in a continuous manner. Thus, the gasket affixing area 120 of the present embodiment can affix the gasket 300 integrally across the light blocking area 121, the inclined area 123, and the abnormal sound prevention area 122 by making the light blocking area 121 and the abnormal sound prevention area 122 continuous with each other via the inclined area 123.

The gasket 300 of the present embodiment includes a slit 340 provided in the connecting part 330 and formed in a direction crossing the inclination direction of the inclined area 123. As illustrated in FIG. 3, the slit 340 of the present embodiment is a portion provided closer to the abnormal sound prevention part 320 and is disposed on a ridge line formed between the abnormal sound prevention area 122 and the inclined area 123. The slit 340 is a pair of notches provided at ends positioned spaced apart from each other in the second width direction Y and is formed from the outer side toward the inner side in the second width direction Y. The slit 340 is set to be shorter than the length of the connecting part 330 in the second width direction Y and thus does not penetrate the connecting part 330 in the second width direction Y, and ends positioned on the inner side in the second width direction are closed ends. Thus, the slit 340 can narrow the width (the length in the second width direction Y) of the connecting part 330 and weaken the stiffness of the gasket 300 (for example, the elasticity of the gasket 300), thereby providing it with flexibility.

As described above, the gasket affixing structure 1 of the present embodiment includes the first component 100 in which the light source 400 is disposed in the internal space part 110S sectioned by the wall part 110K and having the opening part 111 opening along the emitting direction L1z of the light (the emitted light L1) from the light source 400, the second component 200 stacked on and assembled to the first component 100 so as to cover the opening part 111 of the first component 100, and the gasket 300 affixed to the gasket affixing area 120 interposed between the first component 100 and the second component 200. The gasket affixing area 120 includes the light blocking area 121 surrounding the opening part 111, the abnormal sound prevention area 122 positioned on a plane different from the light blocking area 121 and having the step d with respect to the light blocking area 121, and the inclined area 123 connecting the light blocking area 121 and the abnormal sound prevention area 122 to each other to make them continuous with each other. The gasket 300 is affixed integrally across the light blocking area 121, the inclined area 123, and the abnormal sound prevention area 122.

With this configuration, the gasket affixing structure 1 connects the light blocking area 121 and the abnormal sound prevention area 122, which are required to interpose the gasket 300 between the first component 100 and the second component 200, to each other by the inclined area 123 and can thereby make the gasket affixing area 120 a single integral area. Thus, the gasket affixing structure 1 can integrate the gasket 300 affixed to the gasket affixing area 120 into one. In addition, the gasket 300 is integrated into one, reducing the number of gaskets 300 affixed to the gasket affixing area 120, and thereby work efficiency during assembly can be improved. In addition, the gasket 300 is integrated into one, reducing the man-hours for affixing the gasket 300 to the gasket affixing area 120, and thereby misalignment of the gasket 300 with respect to the gasket affixing area 120 can be prevented from occurring. In addition, the light blocking area 121 and the abnormal sound prevention area 122, which are positioned on different planes, are connected to each other by the inclined area 123, and thereby the gasket 300 can be made less likely to float between the light blocking area 121 and the abnormal sound prevention area 122. Thus, the gasket 300 affixed to the gasket affixing area 120 can be made less likely to peel off. Thus, the gasket affixing structure 1 can take soundproofing measures while properly taking light leakage measures because the gasket 300 is properly affixed to the light blocking area 121, the abnormal sound prevention area 122, and the inclined area 123.

Further, the gasket 300 described above includes the light blocking part 310 positioned on the light blocking area 121, the abnormal sound prevention part 320 positioned on the abnormal sound prevention area 122, and the connecting part 330 positioned on the inclined area 123. With this configuration, the gasket affixing structure 1 is provided with the gasket 300 in accordance with the light blocking area 121, the abnormal sound prevention area 122, and the inclined area 123 of the gasket affixing area 120. The light blocking area 121 can prevent the emitted light L1 emitted from the light source 400 from leaking passing through the gap formed between the first component 100 and the second component 200 from the internal space part 110S in which the light source 400 is disposed because the light blocking part 310 of the gasket 300 is affixed to the light blocking area 121. The abnormal sound prevention area 122 can prevent an abnormal sound from occurring caused by the interference of the first component 100 with the second component 200 because the abnormal sound prevention part 320 of the gasket 300 is affixed to the abnormal sound prevention area 122. Thus, the gasket affixing structure 1 can take soundproofing measures while properly taking light leakage measures because the gasket 300 is properly affixed to the gasket affixing area 120.

Further, the gasket 300 described above has the slit 340 positioned in the inclined area 123 and formed in a direction crossing the inclination direction of the inclined area 123 (the first width direction X). With this configuration, the gasket affixing structure 1 can make it easier to affix the gasket 300 to the gasket affixing area 120 by weakening the stiffness of the gasket 300 by the slit 340. At the same time therewith, the gasket 300 affixed to the gasket affixing area 120 can be made less likely to peel off by making the gasket 300 easily come in intimate contact with the gasket affixing area 120. Thus, the gasket affixing structure 1 can take soundproofing measures while properly taking light leakage measures because the gasket 300 is properly affixed to the gasket affixing area 120.

Further, the light source 400 described above is the warning lamp forming the telltale that can display warning in accordance with the status of the vehicle. With this configuration, the gasket affixing structure 1 can prevent warning lamps and gauges disposed adjacent to each other from appearing to glow owing to the emitted light L1 emitted from the light source 400 leaking through the gap formed between the first component 100 and the second component 200. Thus, the gasket affixing structure 1 can properly take light leakage measures and prevent an unintended indicator light from being visually recognized because the gasket 300 is properly affixed to the gasket affixing area 120.

The gasket affixing structure 1 according to the embodiment of the present invention described above is not limited to the embodiment described above, and various modifications can be made within the scope described in the claims.

For example, the abnormal sound prevention area 122 is described as being positioned with the step d on the upper side in the stacking direction Z with respect to the light blocking area 121, but the position of the abnormal sound prevention area 122 with respect to the light blocking area 121 is not limited to a particular position, and it may be positioned with a step on the lower side in the stacking direction Z.

The second component 200 is described as the cover glass, but it is not limited to a particular component so long as it is a plate-like component formed of a translucent material. For example, the second component 200 may be a dial plate stacked and assembled between the case corresponding to the first component 100 and a cover glass.

The number of slits 340 formed in the gasket 300 is not limited to a particular number. The shape of the slit 340 is not limited to the form illustrated in FIG. 3. The position of the slit 340 is not limited to a particular position so long as it is a position disposed over the inclined area 123.

The light source 400 is described as the warning lamp forming the telltale, but it may be used as a light source for an indicator light other than the telltale, and its use is not limited to a particular use.

The gasket affixing structure according to the present embodiment may be configured by combining the components of the embodiments and the modifications described above with each other as appropriate.

The gasket affixing structure according to the present embodiment produces the effect of making it possible to take soundproofing measures while properly taking light leakage measures.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A gasket affixing structure comprising:
a first component in which a light source is disposed in an internal space part sectioned by a wall part and having an opening part opening along an emitting direction of light from the light source;
a second component stacked on and assembled to the first component so as to cover the opening part of the first component; and
a gasket affixed to a gasket affixing area interposed between the first component and the second component,
the gasket affixing area including a light blocking area surrounding the opening part, an abnormal sound prevention area positioned on a plane different from the light blocking area and having a step with respect to the light blocking area, and an inclined area connecting the light blocking area and the abnormal sound prevention area to each other to make the light blocking area and the abnormal sound prevention area continuous with each other, and the gasket being affixed integrally across the light blocking area, the inclined area, and the abnormal sound prevention area.

2. The gasket affixing structure according to claim 1, wherein
the gasket includes a light blocking part positioned on the light blocking area, an abnormal sound prevention part positioned on the abnormal sound prevention area, and a connecting part positioned on the inclined area.

3. The gasket affixing structure according to claim 2, wherein
the gasket has a slit positioned in the inclined area and formed in a direction crossing an inclination direction of the inclined area.

4. The gasket affixing structure according to claim 1, wherein
the light source is a warning lamp forming a telltale capable of displaying warning in accordance with a status of a vehicle.

5. The gasket affixing structure according to claim 2, wherein
the light source is a warning lamp forming a telltale capable of displaying warning in accordance with a status of a vehicle.

6. The gasket affixing structure according to claim 3, wherein
the light source is a warning lamp forming a telltale capable of displaying warning in accordance with a status of a vehicle.

* * * * *